United States Patent [19]

Jean-Jacques

[11] Patent Number: 4,936,009

[45] Date of Patent: Jun. 26, 1990

[54] DEVICE FOR ASSEMBLING THE PARTS OF AN ANGLE LINKAGE

[75] Inventor: Kautt Jean-Jacques, Strasbourg, France

[73] Assignee: Ferco International, Sarrebourg, France

[21] Appl. No.: 305,714

[22] Filed: Feb. 3, 1989

[30] Foreign Application Priority Data

Feb. 16, 1988 [FR] France .................. 88 01968

[51] Int. Cl.⁵ .......................................... B23P 19/04
[52] U.S. Cl. ........................................ 29/796; 29/791
[58] Field of Search ................ 29/173, 791, 796; 74/501.6, 500.5; 198/339.1, 410

[56] References Cited

FOREIGN PATENT DOCUMENTS 3020453 1/1982 Fed. Rep. of Germany .
2589933 5/1987 France .

OTHER PUBLICATIONS

Feinwerktechnik & Messtechnik, vol. 90, No. 6, Sept. 1982, pp. 71-72.

*Primary Examiner*—P. W. Echols
*Attorney, Agent, or Firm*—Sandler & Greenblum

[57] ABSTRACT

An assembly device includes automatic assembly facilities to bring together the different parts of an angle linkage. Such automatic assembly facilities are made up of an assembly machine including, in particular, a conveyer moving forward step-by-step in order to progressively bring the angle linkage adjacent to an assembly position and/or a series of assembly positions. The machine, moreover, includes a device for imparting forward motion, a device for putting the different parts integrally connected with the conveyer in the active position and/or the waiting position, a device for the lateral displacement of riveting, facilities for monitoring, and in combination with these devices, facilities for rotation giving the angle linkage a succession of sequential rotation movements causing certain parts of the angle linkage to face successively upwardly.

18 Claims, 2 Drawing Sheets

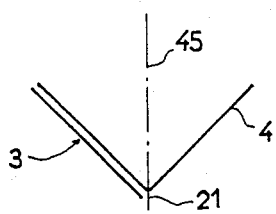
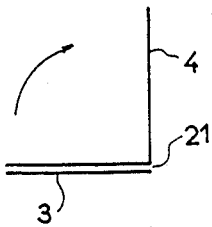
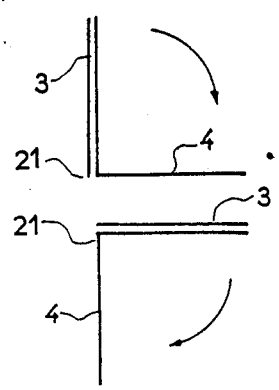
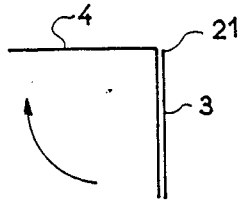
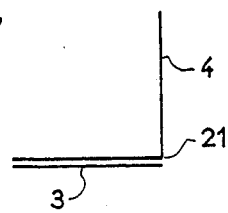
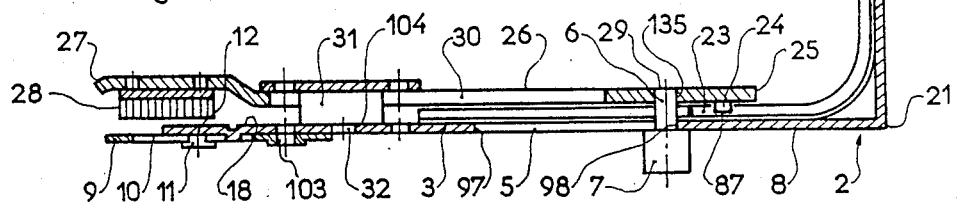

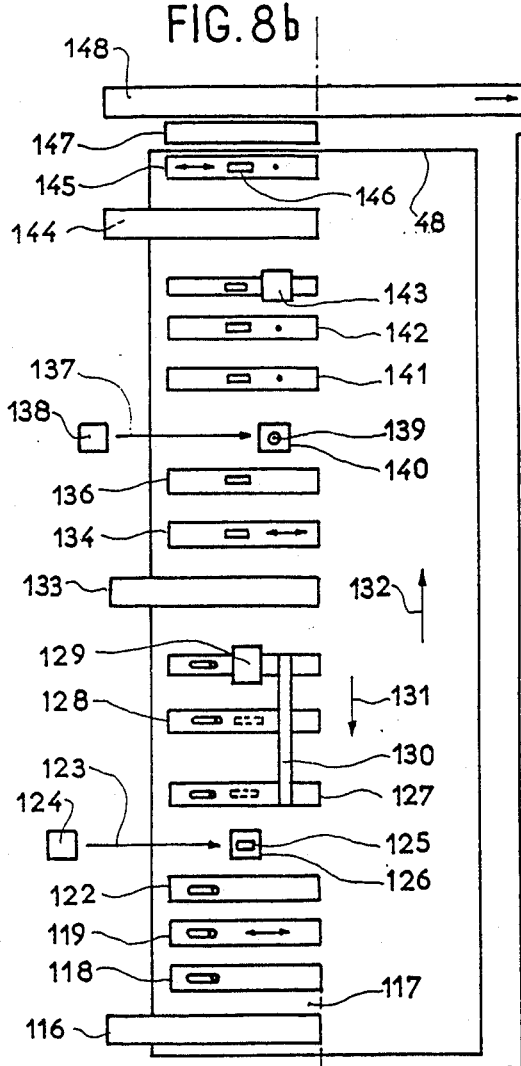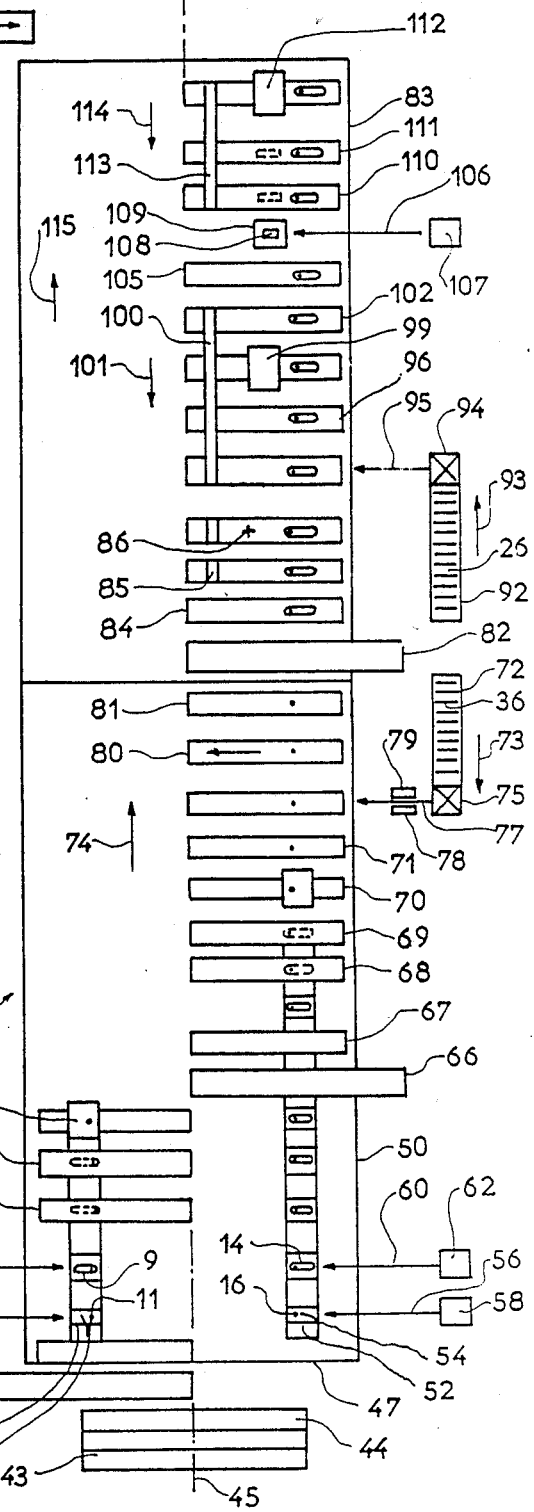

DEVICE FOR ASSEMBLING THE PARTS OF AN ANGLE LINKAGE

BACKGROUND OF THE INVENTION

1. Field of the Invention

The invention relates to a device for assembling the parts of an angle linkage consisting of a right-angled edge plate made up of two arms perpendicular to one another of which one has a longitudinal aperture, a guide rail integrally connected with the inside faces of the two arms, a first and second covering plate integrally connected respectively with the two arms by riveting, a first and second linking member interconnected by an elastic assembly comprising several leaf springs, a first and second guide screw integrally connected by riveting with the two arms of the edge plate, respectively, and a locking element passing through the longitudinal aperture in one of the arms of the edge-plate and integrally connected by riveting with one of the linking members.

2. Description of Background and Relevant Information

There is already known an installation for the linear assembly of an item of ironware such as a cremorne bolt consisting of an edge-plate, a housing integrally connected with the latter and containing a door-knob hole, a pinion, possibly a bevel gear, tubular casings and assembly rivets, and at least one operating rod provided with an end locking element and, possibly at least one intermediate locking element. Such an installation includes a conveyor moving forward step by step, progressively bringing the item of ironware to a position that is linearly level with an assembly position and/or a series of assembly positions having at least one storage magazine for the different parts to be assembled, and facilities for picking up and conveying parts from the storage magazine to their assembly position. The step-by-step conveyor includes facilities for forward movement combined with means for changing location between two assembly positions or two series of assembly positions, in order to provide the item of linear ironware with directional travel to bring it beneath assembly positions and/or series of assembly positions.

However, the bidirectional travel is located in a horizontal plane and is made up of rectilinear forward movements and changes of lateral position. For this reason, assembly of the different parts can be effected only from one face of the linear item of ironware.

A device for the assembly of the different parts of an item of ironware, such as compasses, is known. This device includes, for each part to be assembled, at least one assembly position, a conveyor moving forward step by step presenting the longitudinal axis of the compasses perpendicular to the line of forward movement in front of the assembly positions or positions, means for lateral change of position of the compasses and facilities for positioning. In addition, this assembly device includes at least one turning device in order to upwardly turn either the front or the back of the compasses, the longitudinal axis of which remains perpendicular to the line of forward movement. A device making possible the assembly of a linear item of ironware is therefore again involved.

Also known is an assembly machine for the different parts of an item of linear ironware such as an assembly made up of an operating rod and an edge-plate and interacting, through the intermediary of an auxiliary arm, with compasses integrally connected with the frame of a swing window. In addition to the assembly position or positions, the conveyor moving forward step by step presenting the longitudinal axis of the operating rod-edge-plate perpendicularly to the line of forward movement in front of the assembly position or positions, means for changing the lateral position of the assembly and facilities for assembly of the different parts coming from the different storage magazines either on the front or on the back of the operating rod-edge plate assembly. The assembly machine has a conveyor moving forward step by step, provided with means for placing in the waiting position and/or in the active position, the different parts to be assembled, such as the edge-plate, the operating rod, the hinge pin, the fail-safe case, the guide screw, the locking sockets and the locking roller.

These means for placing the different parts to be assembled in the waiting and/or the active position consist of stops integrally connected with the conveyor moving forward step by step. Such stops consist, on the one hand, of parallel transverse recesses into which the operating rods and edge-plates are inserted and, on the other hand, the apertures which, as assembly moves progressively forward, house the hinge pin of the auxiliary arm, the auxiliary arm, the fail-safe case, the guide screw, the locking sockets interacting with the locking rack of the compasses and the locking roller.

This machine also achieves only the assembly of a linear item of ironware and assembly of the different parts of the angle linkage can only be carried out manually.

SUMMARY OF THE INVENTION

The purpose of this invention is to provide automatic assembly of a right-angled item of ironware consisting of a right-angled edge-plate, the inside face of which is provided with a guide rail within which moves a mobile assembly made up of elastic strips, the ends of which are integrally connected by pin to linking members. The ends of these linking members include a connecting sleeve joining the mobile assembly of the angle linkage to the adjacent operating rods.

To this end, the invention relates to a device for the assembly of the parts of an angle linkage consisting of a right-angled edge plate, made up of two arms perpendicular to one another of which one has a longitudinal aperture, a guide rail integrally connected with the inside faces of the two arms, a first and second covering plate integrally connected respectively by riveting with the two arms, a first and second linking member interconnected by an elastic assembly consisting of several leaf springs, a first and second guide screw integrally connected by riveting with the two arms, respectively, of the edge-plate, and a locking element passing through the longitudinal aperture in one of the arms of the edge-plate and integrally connected by riveting with one of the linking members, characterized by the fact that it includes facilities for automatic assembly of the different parts of the angle linkage.

In accordance with an aspect of, the invention, the device includes an assembly machine comprising a conveyor moving forward step by step, progressively presenting the angle linkage level with an assembly position and/or a series of assembly positions and made up of means for forward travel, facilities for placing the different parts integrally connected with the conveyor moving forward step by step, means of changing lateral position, facilities for riveting and monitoring, and having, in combination with such facilities, rotation facilities causing the angle linkage to make a succession of sequential rotation movements causing successively to face upwardly the inside face of the first arm, the inside face of the second arm, the outside face of the first arm and the outside face of the second arm of the right-angled edge-plate, means for laterally aligning certain part to be assembled in the transverse edge of the guide rail integrally connected with the two arms for the edge-plate, means for preventing the untimely tilting for the angle linkage and means for monitoring movement of the locking roller, in a direction perpendicular to the direction of forward movement of the angle linkage.

The advantages of the invention consist essentially in the fact that assembly of the angle linkage is effected automatically, making it possible to increase the speed of assembly, and therefore of the manufacture of the angle linkage and hence, reduce the cost of the latter and to eliminate the chance of human error in the course of assembly.

BRIEF DESCRIPTION OF THE DRAWINGS

The invention will be readily understood by reference to the following description given by way of non-restrictive example and to the attached drawings in which:

FIG. 1 is a view in vertical section of an angle linkage;

FIG. 2 is a diagramatic view of the position of the right-angled edge-plate on entering the assembly machine in accordance with the invention;

FIG. 3 is a diagramatic view of the position of the right-angled edge plate before commencement of the stages of assembly, the inside face of the first arm facing upwardly;

FIG. 4 is a diagramatic view of the position of the right-angled edge plate after a first sequential rotation, the inside face of the second arm facing upwardly;

FIG. 5 is a diagramatic view of the position of the right-angled edge plate after a second sequential rotation, the outside face of the first arm facing upwardly;

FIG. 6 is a diagramatic view of the position of the right-angled edge-plate after a third sequential rotation, the outside face of the second arm facing upwardly;

FIG. 7 is a diagramatic view of the position of the right-angled edge plate after a fourth sequential rotation to permit dynamic monitoring of the assembled edge-plate;

FIGS. 8a and 8b are a diagramatic representation of a plan view of the assembly machine in accordance with the invention, FIG. 8b being the continuation of the upper end of FIG. 8a.

DETAILED DESCRIPTION OF THE PREFERRED EMBODIMENT

Reference is made to FIG. 1.

The angle linkage 1 includes a right-angled edge plate 2 of which the two arms 3 and 4 are perpendicular to one another. One of the arms 3, designated the first arm, has a longitudinal aperture 5 permitting movement of the locking element 6, the locking roller 7 of which projects in relation to the outside face 8. Over the latter, along the longitudinal axis of the first arm 3, slides a first covering plate 9 in which is created an oblong aperture 10 through which passes a pin 11 retaining the first covering plate 9 on the outside face 8 of the first arm 3 and integrally connected to the latter by riveting 12.

Similarly, over the outside face 13 of the arm 4, hereinafter designated the second arm, and along the longitudinal axis of the second arm 4, slides a second covering plate 14 in which is created an oblong aperture 15 through which passes a pin 16 retaining the second covering plate 14 on the outside face 13 of the second arm 4 and integrally connected to the latter by riveting 17.

On the inside face 18 of the first arm 3 and on the inside face 19 of the second arm 4 is fixed a guide rail 20. Located at the angle 21 between the two arms 3, 4 of the edge-plate 2, is a curve to facilitate the placement of an elastic assembly 22 which is made up of several leaf springs sliding in the guide rail 20. One of the ends 23 of this elastic assembly 22 is integrally connected by a riveted pin 24 to the end 25 of a first linking member 26, the free end 27 of which is provided with a connecting shoe 28 making it possible to integrally connect the linking member 26 in travel with a first operating rod (not shown). The locking element 6 is integrally connected with the linking member 26 by riveting 29.

An oblong aperture 30 is made in the first linking member 26 through which passes a first guide screw 31 which is integrally connected to the first arm 3 by riveting 32.

The other end 33 of the elastic assembly 22 is integrally connected by a riveted pin 34 with the end 35 of a second linking member 36, the free end 37 of which is provided with a connecting shoe 38 making it possible to integrally connect the latter with a second operating rod (not shown). Thus the transfer movement of the first operating rod is communicated through the intermediary of the first linking member 26, of the elastic assembly 22 and the second linking member 36 to the second operating rod.

In the second linking member 36, an oblong aperture 39 is made, through which passes a second guide screw 40 which is integrally connected with the second arm 4 of the edge plate 2 by riveting 41.

In FIGS. 2 and 7, the first arm 3, provided with the oblong aperture 5, is represented by two parallel lines whereas the second arm 4 is represented diagramatically by a single line.

Composition of the angle linkage has been described to facilitate understanding of the description of the assembly machine 42 in accordance with the invention which is described below.

Reference is made more particularly, on the one hand, to FIGS. 8a and 8b showing the assembly machine 42 in diagram form and, on the other hand, to FIGS. 2 to 7, successively representing the positions of the edge-plate 2 with the progressive development of the different stages of assembly of the various parts of the angle linkage 1.

Downstream from the assembly machine 42, a feed conveyor 43 is installed, on which are manually placed the edge-plates 2 provided with the guide rail 20, the position of the edge plates being possibly that represented by FIG. 2. The only constraint is that all the edge-plates are arranged in a given order. To this end, the feed conveyor 43 includes a monitoring device 44 for checking that the first arm 3, provided with the aperture 5, is always arranged on the same side of the axis 45, which is not only the median axis of the feed conveyor 43 but also the median axis of the assembly machine 42.

The assembly machine 42 includes a conveyor 46 moving forward step by step and carrying the angle linkage 1 from the entrance 47 to the exit 48 of the assembly machine 42 and progressively presenting the angle linkage 1 adjacent to an assembly position and/or series of assembly positions. At the entrance to this assembly machine 42 a manipulator 49 is installed for picking up the edge-plate 2 from the feed device 43 to place it on a first conveyor 50 which progresses step by step, in such a way that the first arm 3 is arranged horizontally, the inside face 18 faces upwardly, and the second arm 4 is vertical and located substantially in the median axis 45 of the assembly machine 42. The position of the edge-plate 2 on first conveyor 50 is illustrated in FIG. 3.

This first conveyor 50, moving step by step and bringing the edge-plate 2 positioned on one side of the median axis 45, includes facilities for putting, on the one hand, the edge-plate 2 and on the other hand, the different parts to be assembled, in the waiting position and/or the active position. Such facilities are the stops 51, 52 arranged on either side of the median axis 45 and integrally connected with the means for forward motion such as a chain, strap or the like. Arranged in these stops 51, 52 are slots for inserting the first arm 3 of the edge-plate 2 and recesses 53, 54. Into these recesses 53, 54 are first of all fitted, by means of a first pair of manipulators 55, 56, the pins 11 and 16 which are picked up by the manipulators 55, 56 from the storage magazines 57, 58. At the next step, a second pair of manipulators 59, 60 picks up from the storage magazines 61, 62 the covering plates 9 and 14 and arranges them on the pins 11, 16, respectively. At the next step, a manipulator 63 grips the edge-plate 2 in the waiting position and arranges its first arm 3 on assembly pin 11/covering plate 9. The edge-plate 2 is thus put into the active position. At the next step, a monitoring position 64 is provided for checking the presence and the correct position of the first arm 3 of the edge-plate 2, the pin 11 and the covering plate 9. Then the assembly edge-plate 2/pin 11/covering plate 9 is positioned beneath a riveting station 65 to effect riveting 12 (see FIG. 1).

After such riveting 12, the edge-plate 2 is taken over by a first rotation facility 66, causing the edge-plate 2 to make a sequential rotation movement of substantially a quarter of a revolution to position the second 4 of the edge-plate 2 horizontally. The inside face 19 of such second arm 4 faces upwardly the first arm 3, however, being vertical and substantially located in the median axis 45 of the assembly machine 2. This position of the edge-plate 2 is illustrated in FIG. 4. This first sequential rotation facility 66 imparts to the edge-plate 2 a rotational motion perpendicular to the step by step forward movement of the conveyor 46. The rotational center of the edge-plate 2 is at the point of intersection 21 of the arms 3 and 4 of the edge-plate. Such point in practice is situated in the same plane as the median axis 45.

By means of this rotation facility 66, the edge-plate 2, which was previously in the active position beneath the riveting station 65, is relocated in the waiting position 67, but now on the other side of the median axis 45. At the next step, a manipulator 68 grips the edge-plate 2 in the waiting position and arranges the second arm 4 on the assembly pin 16/covering plate 14. The edge-plate 2 is thus placed in the active position. At the next step, a monitoring position 69 checks the presence and the correct position of the second arm 4 of the edge-plate 2, of the pin 16 and the covering plate 14. Then the assembly edge-plate 2/pin 16/covering plate 14 is brought under a riveting station 70 to effect riveting 17 (see FIG. 1).

The edge-plate 2, at the next step, is placed in the waiting position 71, for the sequel to the assembly operations.

Positioned on a first feed conveyor 72, the direction of travel 73 of which is opposite to the step by step direction of travel 74 of the first conveyor 50, is the second linking member 36, the free end 37 of which is fitted with the connecting shoe 38 and the other end of which is previously integrally connected, by means of the riveted pin 34, with the end 33 of the elastic assembly 22. This second linking member 36 is placed perpendicularly to the median axis 45 and in such a way that the free end 23 of the elastic assembly 22 is situated on the side of the median axis 45.

Using positioning facilities 75, the second linking member 36 is arranged in the same lateral alignment as the second arm 4 of the edge-plate 2, in such a way that the free end 23 of the elastic assembly 22 faces the edge 76 (see FIG. 1) of the guide rail 20.

Then, through the intermediary of a first alignment facility consisting of an alignment manipulator 77, a tilting movement is imparted to the second linking member 36 in order to put the elastic assembly 22 in contact with the rollers 78, 79 of a lubricating device in order to coat the two faces of the elastic assembly 22 with a film of lubricant. Then, a transfer motion is imparted to the said second linking member 36 in order to introduce the elastic assembly 22 into the guide rail 20. At the next step, through the intermediary of a second means of alignment consisting of a control 80, the elastic assembly 22 is exactly positioned in the guide rail 20. Such precise position is checked by a monitoring station 81.

After the latter step the edge-plate 2 leaves the first conveyor 50. It is taken over by a second rotation facility 82 imparting to the edge-plate 2 a second sequential rotation movement of substantially a quarter of a revolution in the same direction as the first sequential rotation movement imparted by the first rotation facility 66. This second rotation facility 82 picks up the edge-plate 2 from the first conveyor 50 and arranges it on a second conveyor 83 which moves forward step by step, in such a way that the first arm 3 is once again horizontal but the outside face 8 of the latter faces upwardly and the second arm 4 points vertically downwards. After this second sequential rotation movement, the edge plate 2, occupying the position illustrated in FIG. 5, is placed on the second conveyor 83 in the waiting position 84, which is situated on the same side in relation to the median axis 45 as on the first conveyor 50.

Owing to the fact that the second arm 4 is pointing vertically downwards, there is a risk of untimely tilting of the edge-plate 2. For this reason, it is necessary to provide means for preventing the untimely tilting. One such means consists of a stirrup 85 straddling the first arm 3 of the edge-plate 2.

In the next step, a pointer 86, passing through the longitudinal aperture 5 of the first arm 3 of the edge-plate 2, engages the holes 87 (see FIG. 1) of the different leaf springs in the elastic assembly 22. It is indeed imperative that the holes 87 in the different leaf springs should be accurately positioned for insertion of the pin 24 providing the link between the elastic assembly 22 and the first linking member 26.

Parallel to the second conveyor 83, a second feed belt 92 is provided on which are transversely arranged the fist linking members 26, the connecting shoe 28 being the most distant from the median axis 45. The forward movement 93 of such feed belt 92 is identical with the direction 74 of step by the step advance.

Using the means for positioning 94, the first linking member 26 is arranged in the same lateral alignment as the first arm 3 of the edge-plate 2, in such a way that, through a manipulator 95, the first linking member 26 is put into the waiting position, the end 25 of such first linking member 26 being arranged under the free end 23 of the elastic assembly 22.

In the next step, by means of a monitoring station 96, a check is made that the holes 87 in the elastic assembly 22 are in precisely the same vertical plane as the pin 24 which is fitted into the recess 90 in the stop 91 and are subjected to the same forward step by step movement and that such holes 87 are situated between the edges 97, 98 (see FIG. 1) of the longitudinal aperture 5 of the arm 3 of the edge-plate. After this check, the edge-plate 2 is placed beneath a riveting station 99, the riveting tool passing through the longitudinal aperture 5. In the course of transfer of the edge-plate 2 from the position of the pointer 86 to the riveting station 99, the edge-plate 2 is retained by a second means for prevention consisting of a retaining pad 100 preventing any untimely tilting of the edge-plate 2. The retaining pad, previously raised, is subjected to a change of position 101 in a direction opposite to that of the step by step advance 115 of the second conveyor 83, such step by step advance being identical to the direction 74 of the first conveyor 50. For this reason, as soon as the edge-plate is no longer retained by the stirrup 85, the retaining pad 100 rests on the first arm 3 of the edge-plate and rises each time the edge-plate 2 advances makes one step forward.

After the pin 24 is riveted, the edge-plate 2 is brought adjacent to a monitoring station 102 for checking that the first covering plate 9 slides freely and for arranging the hole 103 in the latter in the same vertical plane as a hole 104 provided in the first arm 3 of the edge-plate 2, such hole 103 being subsequently intended to receive the riveting stud of the first guide screw 31 (for references 103 and 104 see FIG. 1).

At the next step, the edge-plate 2 is placed in the waiting position 105. Simultaneously, a manipulator 106 picks up the first guide screw 31 from a storage magazine 107 and arranges it in a recess 108 created in a stop 109 which is integrally connected with the second conveyor 83. Then, after a single step forward, a manipulator 110 arranges the edge-plate 2 on the first guide screw 31.

The correct position and the presence of the first guide screw 31 and of the edge-plate 2 are checked by a monitoring station 111. After this check, the edge-plate 2 is brought under a riveting station 112 for applying riveting 32 through the hole 103 in the first covering plate 9.

In the course of transfer of the edge-plate 2 from its waiting position 105 to the riveting station 112, the edge-plate 2 is retained by a third means of prevention consisting of a second retaining pad 113 for preventing any untimely tilting for the edge-plate 2. Like the previous pad 100, the second retaining pad 113 is placed in advance in a high position, is subjected to a change of position and 114 in a direction opposite to that of the step by step forward movement 115 of the second conveyor 83. For this reason, as soon as the edge-plate is no longer retained by the first retaining pad 100, it is taken over by the second retaining pad 113.

After riveting, the edge-plate 2 is taken over by a third rotation facility 116 for imparting to the edge-plate 2 a third sequential rotation movement of substantially a quarter of a revolution in the same direction as the first two sequential rotation movements, while picking up the edge-plate 2 from the second conveyor 83 to arrange it on a third step by step conveyor 117, the latter being situated, in relation to the conveyors 50 and 83, on the other side of the median axis 45. Thus, the second arm 4 of the edge-plate 2 is once again horizontal but the outside face 13 is facing upwardly and the first arm 3 is pointing vertically downwards. After this third sequential rotation movement, the edge-plate 2, occupying the position shown in FIG. 6, is placed in the waiting position 118 on the third conveyor 117.

At the next step, the edge-plate 2 is brought adjacent to a monitoring station 119 for checking that the second covering plate 14 slides freely and for arranging the orifice 120 in the latter in the same vertical plane as an orifice 121 provided in the second arm 4 of the edge-plate 2 and intended to receive the riveting stud of the second guide screw 40 (for reference 120 and 121, see FIG. 1).

Then the edge-plate 2 is placed in the waiting position 122. Simultaneously, a manipulator 123 picks up the second guide-screw from a storage magazine 124 and arranges it in a recess 125 in a stop 126 which is integrally connected with the third conveyor.

Then, after a single step forward movement, a manipulator 127 places the edge-plate 2 on the second guide-screw 40.

A monitoring station 128 checks that the second guide screw 40 and the edge-plate 2 are present and that the position of one part in relation to the other is correct. After this check, the edge-plate 2 is placed under a riveting station 129 for applying riveting 41 through the orifice 120 in the second covering plate 14.

For such assembly, ranging from the waiting position 122 to the riveting station 129, a means for prevention of untimely tilting of the edge-plate 2 is provided, consisting of a third retaining pad 130. The latter is placed in a high position at the transfer stage, and is subjected to a movement 131 in a direction opposite to that of the step by step forward movement 132 of the third conveyor 117 and then comes to rest again on the edge-plate 2 and holds the latter on the second guide-screw 40 until the latter is riveted.

After riveting, the edge-plate 2 is taken over by a fourth rotation facility 133 imparting to the edge-plate 2 a fourth sequential rotation movement of substantially a quarter of a revolution in the same direction as the first three sequential rotation movements. For this reason, the first arm 3 of the edge-plate 2 is once again put into a horizontal position and the inside face 18 faces upwardly. The edge-plate 2 occupies the position shown in FIG. 7 which corresponds to the position shown in FIG. 3. In fact, because of the different successive sequential rotation movements in the same direction, the edge-plate 2 has been subjected to a complete rotation. As illustrated in FIGS. 3 to 7, the direction of rotation corresponds to that of the hands of a watch, that is in the clockwise direction.

Using a manipulator 134, repositioning is effected of the mobile assembly consisting of the first linking member 26, the elastic assembly 22 and the second linking member 36 in such as way that the orifice 135 (see FIG. 1), into which is fitted the pin for the locking element 6 to effect riveting 29, can be seen in the longitudinal aperture 5 in the first arm 3 of the edge-plate 2. After such repositioning, the edge-plate 2 is placed in the waiting position 136. Simultaneously, a manipulator 137 picks up a locking element 6 from a storage magazine 138 and places it in a recess 139 in a stop 140 which is integrally connected with the third conveyor 117.

At the next step, a manipulator 141 arranges the edge-plate 2 on the locking element 6. Then the edge-plate 2, provided with the locking element 6, is presented at a monitoring station 142 before being positioned under a riveting station 143.

After riveting, the angle linkage 1 which is fully assembled, is taken over by a manipulator 144 which places the angle linkage 1 on a general monitoring station 145. The latter includes a base provided with a longitudinal aperture 146 into which is fitted the locking roller 7 of the locking element 6.

Through the general monitoring station 145, there is progression beyond a static monitoring check, that is, a check only on the presence of the different parts, to a dynamic monitoring check, that is, the locking element 6, the roller 7 of which passes through the longitudinal aperture 146, is given a to and fro motion by drawing along, by means of a manipulator arranged under the base to monitor the correct functioning of the angle linkage. Such to and fro movement is perpendicular to the direction of travel of the third conveyor 117.

After such general monitoring, the angle linkage 1 is transferred by a manipulator 147 from the exit 48 of the assembly machine 42 onto a discharge conveyor 148 arranged downstream from the latter.

I claim:

1. A device for the assembly of the parts of an angle linkage, said angle linkage comprising a right-angled edge plate having two arms arranged perpendicular to one another, one of said arms including a longitudinal aperture, a guide rail connected to inside faces of said two arms, a first and second covering plate respectively connected to said two arms, a first and second linking member interconnected by an elastic assembly, said elastic assembly including at least one leaf spring, a first and second guide-screw connected, respectively, to said two arms of said edge plate, and a locking element which passes through said longitudinal aperture and is connected to one of said linking members, said device comprising:
   (a) a conveyer for progressively moving said angle linkage to a series of assembly positions;
   (b) means for respectively connecting said first and second covering plate to said two arms;
   (c) at least one means for monitoring whether elements of said angle linkage have been properly assembled;
   (d) means for rotating said angle linkage through a sequence of rotational movements;
   (e) means for preventing untimely tilting of said angle linkage during at least part of its movement through said series of assembly positions; and
   (f) means for inhibiting lateral movement of said locking element in a direction transverse to the direction of travel of said conveyor during at least part of the movement of said angle linkage through said series of assembly positions.

2. Device for the assembly of the parts of an angle linkage in accordance with claim 1, further including means for riveting said first and second covering plate, respectively, to said two arms.

3. Device for the assembly of the parts of an angle linkage in accordance with claim 1, further including means for riveting said first and second guide-screw, respectively, to said two arms.

4. Device for the assembly of the parts of an angle linkage in accordance with claim 1, further including riveting means for riveting said locking element to one of said linking members.

5. Device for the assembly of the parts of an angle linkage in accordance with claim 1, wherein said conveyer is a step-by-step conveyer.

6. Device for the assembly of the parts of an angle linkage in accordance with claim 5, wherein said means for preventing the untimely tilting of the edge-plate includes at least one retaining pad subjected, on each step-by-step forward movement of the edge-plate, to a lifting movement, to a change of position in a direction opposite to that of the step-by-step forward movement of the edge-plate, then to a lowering movement to come to rest on an arm of the edge-plate.

7. Device for the assembly of the parts of an angle linkage in accordance with claim 1, wherein said means for rotation enables an inside face of a first arm of said right-angled edge plate to first face upwardly, then enables an inside face of a second arm to face upwardly, then enables an outside face of a first arm to face upwardly, and then enables an outside arm of a second arm to face upwardly.

8. Device for the assembly of the parts of an angle linkage in accordance with claim 7, wherein the sequence of rotational movements of said means for rotation is substantially perpendicular to the direction of travel of said conveyer.

9. Device for the assembly of the part of an angle linkage in accordance with claim 1, wherein said angle linkage includes an edge-plate made up of two arms forming an angle at their point of junction, the assembly device including means for rotation causing the angle linkage to make a succession of sequential rotation movements, the center of which is substantially situated at the point of intersection of the arms.

10. Device for the assembly of the parts of an angle linkage, in accordance with claim 1, including means for rotation causing the angle linkage to make a succession of sequential rotation movements having a continuous rotation direction.

11. Device for the assembly of the parts of an angle linkage, in accordance with claim 1, including means for rotation causing the angle linkage to make a succession of sequential rotation movements having a continuous rotational direction in a clockwise direction.

12. Device for the assembly of the parts of an angle linkage in accordance with claim 1, including means for lateral alignment comprising:
   (a) a feed conveyer having a direction of travel opposite to the direction of travel of the conveyer, said feed conveyer comprising three conveyers arranged in sequence and subject to step-by-step forward movement;
   (b) an alignment manipulator engaging the free end of the elastic assembly which is integrally connected with the second linking member and situated in the same lateral alignment as the second arm of the edge-plate in a waiting position.
   (c) and a control for precisely positioning the elastic assembly in the guide rail.

13. Device for the assembly of the parts of an angle linkage in accordance with claim 12, including an alignment manipulator having a tilting movement to put the elastic assembly into contact with a lubricating device comprising rollers between which the elastic assembly passes.

14. Device for the assembly of the parts of an angle linkage in accordance with claim 1, wherein said means for preventing the untimely tilting of the edge-plate comprises a stirrup straddling one of the arms of the edgeplate and holding the edge-plate in position when the other arm is pointing downwardly.

15. Device for the assembly of the parts of an angle linkage in accordance with claim 1, wherein said conveyer includes a step-by-step conveyer including a first step-by-step conveyer having stops arranged on either side of the median axis of the assembly machine and provided with recesses into which are placed, in a waiting position and by means of a first pair of manipulators, pins and selected from first storage magazines and, by a second pair of manipulators, the covering plates selected from second storage magazines, the first pair of manipulators and the first storage magazines being situated on one side of the median axis and the second pair of manipulators and the second storage magazines being situated on the other side of the median axis.

16. Device for the assembly of the parts of an angle linkage including an edge-plate comprising two arms arranged perpendicular to one another and of which one has an oblong aperture, and a first and second linking member interconnected by an elastic assembly having free ends provided with holes, in accordance with claim 1, said device including a pointer passing through the longitudinal aperture in one of the arms of the edge-plate and interacting with the holes in the free end of the elastic assembly which are integrally connected with one of the linking members, for positioning the elastic assembly.

17. Device for the assembly of the parts of an angle linkage in accordance with claim 1, including an assembly machine having a general monitoring position providing a static control for monitoring the presence of the different parts and, a dynamic control for the functioning of the mobile assembly comprising the two linking members and the elastic assembly.

18. Device for the assembly of the parts of an angle linkage in accordance with claim 17, including a general monitoring position comprising a base provided with a longitudinal aperture traversed by the locking roller of the locking element, said locking roller being subjected to a to and fro motion perpendicular to the step-by-step forward travel of the angle linkage through the intermediary of a manipulator arranged on the base.

* * * * *